US007505591B2

(12) United States Patent
Yun

(10) Patent No.: US 7,505,591 B2
(45) Date of Patent: Mar. 17, 2009

(54) PERSONAL VIDEO RECORDER AND METHOD FOR CONTROLLING THEREOF

(75) Inventor: Hwa Young Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 650 days.

(21) Appl. No.: 10/927,061

(22) Filed: Aug. 27, 2004

(65) Prior Publication Data

US 2005/0078950 A1 Apr. 14, 2005

(30) Foreign Application Priority Data

Aug. 29, 2003 (KR) ..................... 10-2003-0060221

(51) Int. Cl.
*H04N 7/167* (2006.01)

(52) U.S. Cl. ...................................................... 380/212

(58) Field of Classification Search .................... 380/28
See application file for complete search history.

(56) References Cited

U.S. PATENT DOCUMENTS

2003/0072555 A1* 4/2003 Yap et al. ...................... 386/40
2003/0076955 A1* 4/2003 Alve et al. .................. 380/201
2004/0013406 A1* 1/2004 Barton et al. ................. 386/69
2004/0015993 A1* 1/2004 Yacenda et al. ............... 725/87
2004/0028227 A1* 2/2004 Yu ............................ 380/201
2004/0040035 A1* 2/2004 Carlucci et al. ............... 725/32

* cited by examiner

*Primary Examiner*—Andrew L Nalven
(74) *Attorney, Agent, or Firm*—Birch, Stewart, Kolasch & Birch, LLP

(57) ABSTRACT

The present invention provides a personal video recorder and control method thereof, by which two scrambled transport streams can be descrambled to fit the open cable standard. The present invention includes storing a video stream of a recording channel in a storage means, determining whether a video stream of a displaying channel is transferred the POD module, descrambling the stored video stream of the recording channel using the POD module if the video stream of the displaying channel is not transferred to the POD module, and storing the descrambled video stream in the storage means.

11 Claims, 3 Drawing Sheets

PERSONAL VIDEO RECORDER AND METHOD FOR CONTROLLING THEREOF

This application claims the benefit of the Korean Application No. P2003-60221 filed on Aug. 29, 2003, which is hereby incorporated by reference.

BACKGROUND OF THE INVENTION

1. Field of the Invention

The present invention relates to a personal video recorder (PVR), and more particularly, to a personal video recorder and control method thereof, by which two scrambled transport streams are descrambled.

2. Discussion of the Related Art

Generally, such an encoder as MPEG (moving picture experts group) is used in home appliances field including digital TV, digital camcorder, and the like to reduce both storage and transfer capacities of digital video or audio. Specifically, in digital TV and set-top box (STB), the digital storage system using such a digital storage medium as HDD and DVD (digital versatile disc) is used instead of the analog storage system using conventional VTR (video tape recorder).

The digital camcorder needs an encoder having a complicated standard of MPEG series and should include both encoder and decoder. Lately, a simple compression encoding standard is provided to overcome problems of the MPEG-series encoder that has to perform computation of motion estimation and compensation. The encoding standard of the digital camcorder is disclosed in 'International standard CEI/IEC 61834-2, Recording—Helical-scan digital video cassette recording system using 6.35 mm magnetic tape for consumer use (525-60, 625-50, 1125-60 and 1250-50 systems)—Part 2: SD format for 525-60 and 625-50 systems' and is generally called DV (digital video) format.

The conventional PVR function is limited to storing a TV program corresponding to another channel on mainly viewing one specific program, viewing a TV program stored in HDD via time-shift function, or storing/playing back digital TV signals in/from HDD. Demand for a PVR device equipped with processing and storing functions of various video input signals such as a digital camcorder, digital camera, and the like is raised. For this, instead of preparing or combining the respective chips meeting various types, a system price reduction and system integration enhancement via one unified video decoding chip are more efficient.

However, the related art PVR needs a conditional access system (CAS) module to descramble the scrambled transport stream(s). The CAS module is operative in descrambling a transport stream of a pay channel. Yet, the CAS module failing to fit the U.S. open cable PVR standard is unusable.

SUMMARY OF THE INVENTION

Accordingly, the present invention is directed to a personal video recorder and control method thereof that substantially obviate one or more problems due to limitations and disadvantages of the related art.

An object of the present invention is to provide a personal video recorder and control method thereof, by which two scrambled transport streams can be descrambled to fit the open cable standard.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a personal video recorder according to the present invention includes a demultiplexer receiving a scrambled video stream, a storage means for storing the scrambled video stream outputted from the demultiplexer, a POD (pint of deployment) module receiving the stored video stream to descramble, and an interface transferring the descrambled video stream to the demultiplexer wherein the demultiplexer stores the descrambled video stream transferred from the interface in the storage means.

Preferably, the demultiplexer appends a timestamp to the descrambled video stream.

Preferably, the POD mule detects a descrambling information from the stored video stream.

More preferably, the POD module produces a descrambling key based on the detected descrambling information and a separate descrambling information received from a broadcasting station.

Preferably, the personal video recorder further includes a control unit deciding whether the video stream outputted from the demultiplexer is scrambled.

More preferably, if the video stream outputted from the demultiplexer is scrambled, the control unit controls the interface to transfer the video stream to the POD module.

Preferably, the personal video recorder further includes a first tuner tuning a broadcast channel to be displayed and a second tuner tuning the broadcast channel to be recorded.

In another aspect of the present invention, in a personal video recorder having a POD (point of deployment) module descrambling a scrambled video stream, a personal video recorded control method includes the steps of storing a video stream of a recording channel in a storage means, deciding whether the video stream of a displaying channel is transferred the POD module, if the video stream of the displaying channel is not transferred to the POD module, descrambling the stored video stream of the recording channel using the POD module, and storing the descrambled video stream in the storage means.

Preferably, the video stream of the displaying channel is the video stream received via tuner or the video stream previously stored in the storage means.

Preferably, the step of descrambling the stored video stream of the recording channel includes the steps of reading the stored video stream of the recording channel from the storage means and storing an address of the read video stream.

Preferably, the step of descrambling the stored video stream of the recording channel includes the steps of detecting a descrambling information from the stored video stream of the recording channel, producing a descrambling key based on the detected descrambling information and a separate descrambling information received from a broadcasting station, and descrambling the video stream of the recording channel using the descrambling key.

Preferably, the step of storing the descrambled video stream in the storage means includes the step of appending a timestamp to the descrambled video stream.

Preferably, the step of storing the descrambled video stream in the storage means includes the step of storing an address of the descrambled video stream.

Preferably, the personal video recorder control method further includes the step of tuning the video stream of the recording channel and the video stream of the displaying channel using different tuners, respectively.

Preferably, the personal video recorder control method further includes the step of deciding whether the video stream of the recording channel is scrambled.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
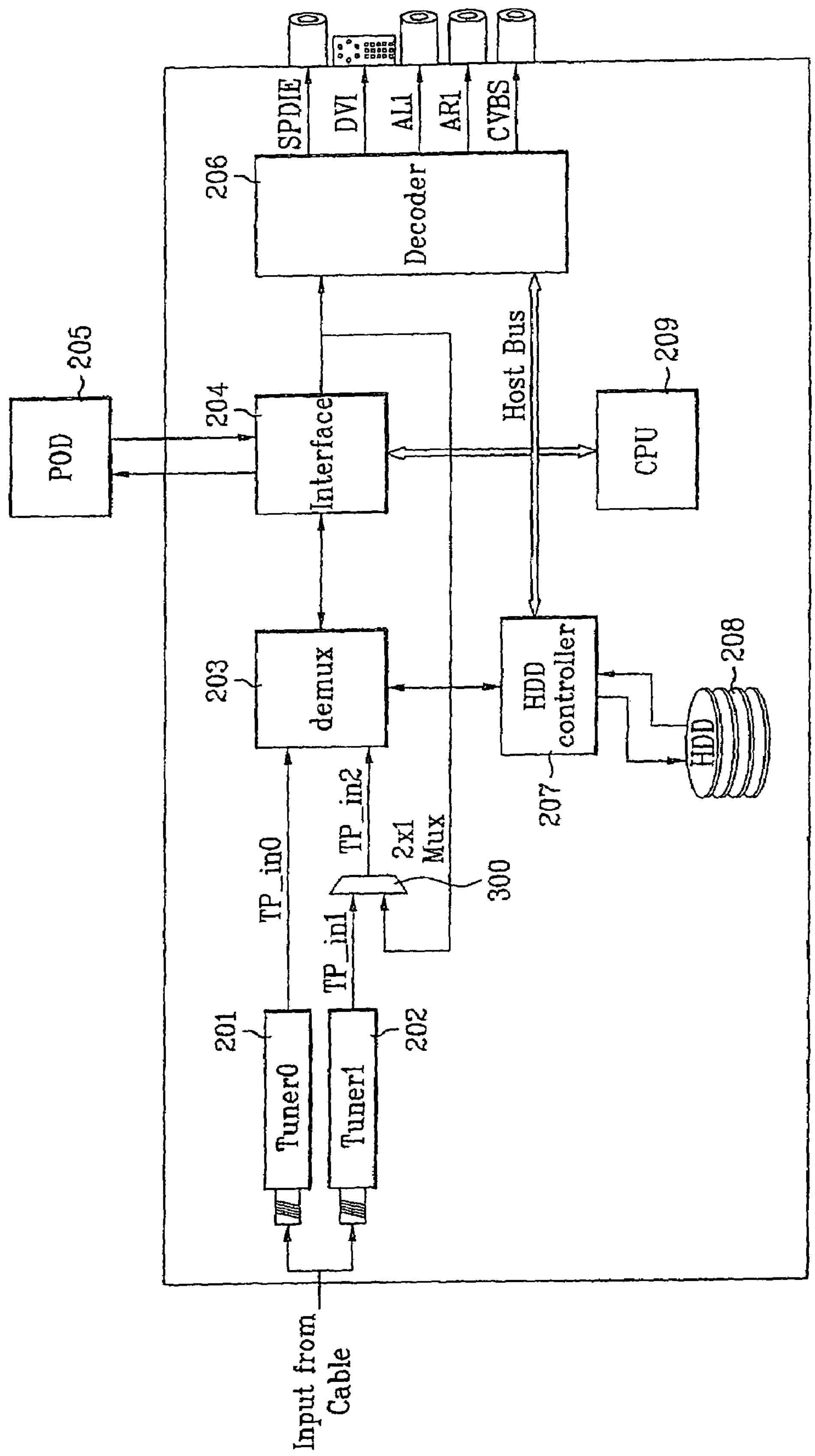
FIG. 1 is a block diagram of a PVR system according to the present invention.

FIG. 1 is a block diagram of a personal video recorder (hereinafter abbreviated PVR) according to the present invention.

Referring to FIG. 1, a pair of tuners 201 and 202 receive a broadcast signal each. One of the tuners 201 and 202 tunes a user-selecting broadcast channel and the other tuner 201 or 202 tunes a broadcast channel for recording. For instance, the first tuner 201 tunes a user-selecting broadcast channel and the second tuner 202 tunes a broadcast channel for recording. A PVR according to another embodiment of the present invention may include one tuner enabling to tune a plurality of channels simultaneously or a plurality of tuners tuning a plurality of channels, respectively.

The PVT according to the present invention includes a plurality of QAM demodulators (not shown in the drawing). The demodulators receive broadcast signals outputted from the tuners 201 and 202 and then convert the received broadcast signals to transport streams, respectively.

A demultiplexer 203 receives the transport streams outputted from the demodulators, decodes the received transport streams, and then delivers the decoded streams to a POD (point of deployment) interface 204. The demultiplexer 203 appends a timestamp to the transport stream corresponding to the broadcast channel for recording and then stores the transport steam in an HDD 208.

The POD interface 204 receives the transport streams from the demultiplexer 203 and provides the received transport streams to a POD module 205 according to a control of a CPU 209. The POD interface 204 provides a communication channel between the CPU 209 and the POD module 205. The CPU 209 decides whether the transport steams inputted to the POD interface 204 are scrambled. And, the CPU 209 controls the POD interface 204 to transfer the scrambled transport stream to the POD module 205.

The POD module 205 receives the scrambled transport steam from the POD interface 204 and then detects descrambling information from the scrambled transport stream. And, the POD module 205 receives another descrambling information via a separate communication channel linked to a broadcasting station. The POD module 205 combines the descrambling information included in the scrambled transport stream and the descrambling information received via the separate communication channel to obtain a descrambling key. The POD module 205 descrambles the transport stream using the descrambling key. The descrambled transport stream is fed back to the demultiplexer 203 via the POD interface 204 or is delivered to an MPEG-2/AC-3 decoder 206.

An HDD controller 207 detects video features such as a video format included in the transport stream, a video volume, and the like from the transport stream outputted from the demultiplexer 203. In storing the transport stream outputted from the demultiplexer 203 in the HDD 208, the HDD controller 207 sets up a storage location of the transport stream. And, the HDD controller 207 controls a reception bit rate of the received transport stream.

A PVR control method according to the present invention is explained in detail as follows.

Figure 2A:
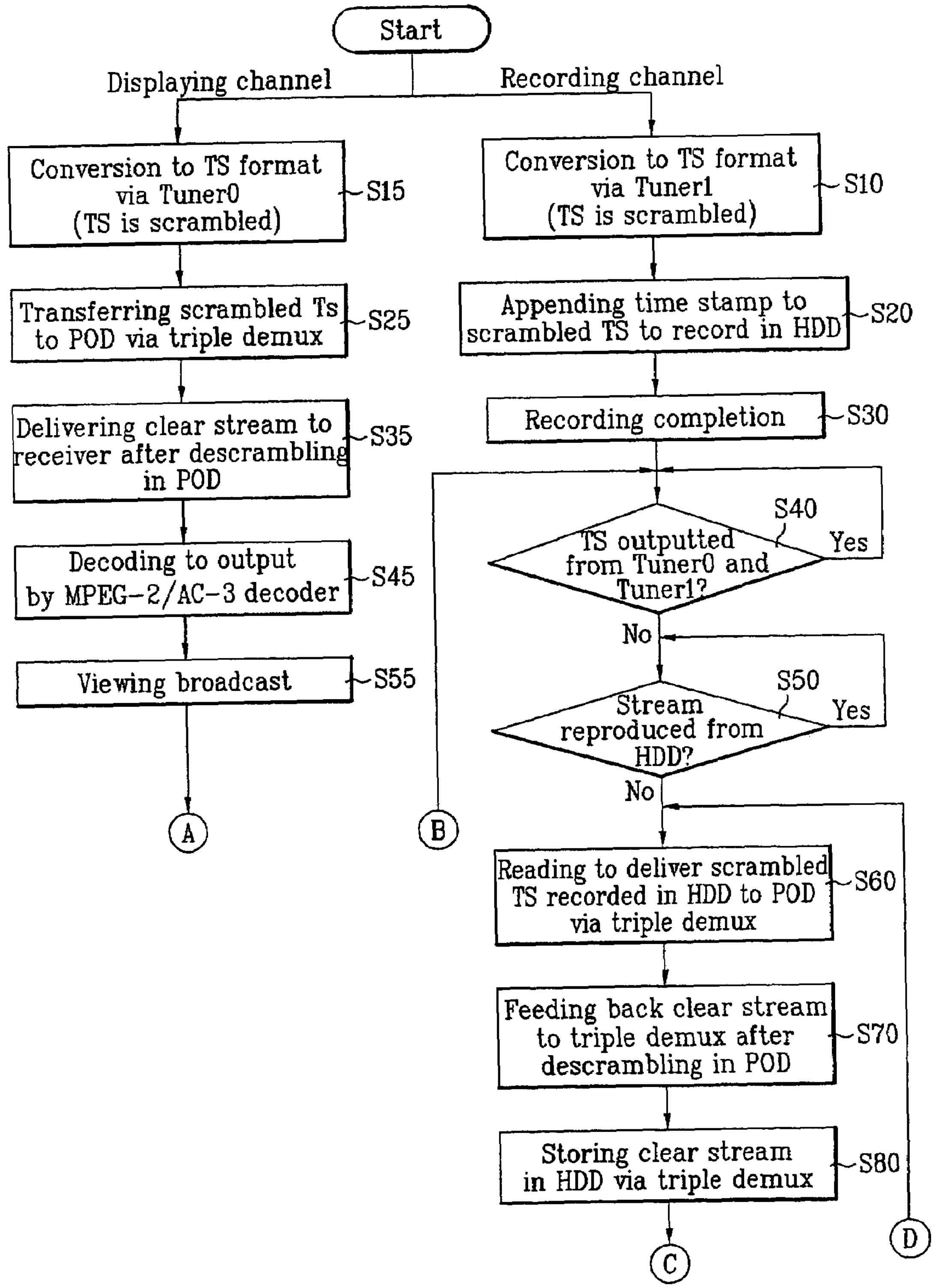
FIG. 2A and FIG. 2B are flowcharts of an operational process of a personal video recorder according to the present invention.
Figure 2B:
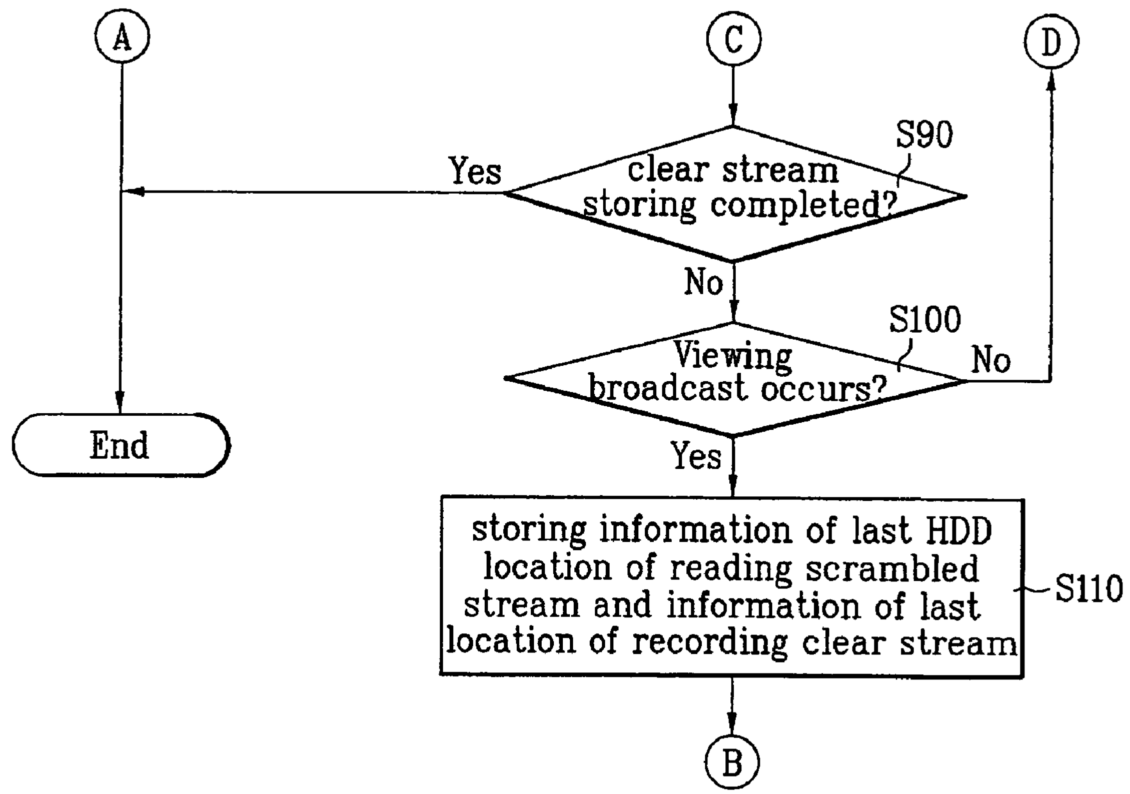

FIG. 2A and FIG. 2B are flowcharts of an operational process of a personal video recorder according to the present invention.

Referring to FIG. 2A, a user-demanding viewing channel is tuned by the tuner 201 (S15). A transport stream (TP_in0) corresponding to the viewing channel is delivered to the demultiplexer 203 and the demultiplexer 203 delivers the transport stream (TP_in0) to the POD interface 204. The CPU 209 decides whether the transport stream (TP_in0) provided to the POD interface 204 is scrambled. If the transport stream (TP_in0) is scrambled, the CPU 209 controls the POD interface 204 to provide the transport stream (TP_in0) to the POD 205 (S25).

The POD 205 descrambles the received transport stream (TP_in0) and then provides the descrambled transport stream (TP_in0) to the POD interface 204 (S35). The POD interface 204 provides the transport stream (TP_in0) to the decoder 206. The decoder 206 decodes the transport stream (TP_in0) to provide to an external device.

A recording channel for recording is tuned by the tuner 202 (S10). The transport stream (TP_in1) corresponding to the recording channel is delivered to the demultiplexer 203. The CPU 209 decides whether the transport stream (TP_in1) is a scrambled stream. If the transport stream (TP_in1) is not scrambled, the CPU 209 stores the transport stream (TP_in1) in the HDD 209 in direct. If the transport stream (TP_in1) is scrambled, the transport stream (TP_in1) should be descrambled.

The POD 205 enables to descramble one transport stream only. While the transport stream (TP_in1) is descrambled, the CPU 209 should decide whether another transport stream is received by the demultiplexer 203 (S40, S50). If another transport stream is not received by the demultiplexer 203, the transport stream (TP_in1) is delivered to the POD 205 and the transport stream (TP_in1) is then descrambled by the POD 205. The descrambled transport stream (TP_in1) is fed back to the demultiplexer via a multiplexer 200 (S70) and is then stored in the HDD 208 (S80).

the transport stream (TP_in0) tuned by the tuner 201 is provided to the demultiplexer 203 (S40) or if the transport stream previously stored in the HDD 208 is provided to the demultiplexer 203 (S50), the transport stream (TP_in1) is not delivered to the POD 205 but is stored in the HDD 208. Subsequently, in case that another transport stream is not received by the demultiplexer 203, the transport stream (TP_in1) stored in the HDD 208 is provided to the POD 205 (S60). The transport stream (TP_in1) is then descrambled by the POD 205. Even if power of a system is turned off, the scrambled transport stream (TP_in1) can be descrambled. The descrambled transport stream (clear stream) is fed back to the demultiplexer 203 via the multiplexer 300 (S70) and is then re-stored in the HDD 208(S80, S90). If another stream is transferred to the POD 205 via the demultiplexer 203 according to a user command while the transport stream (TP_in1) stored in the HDD 208 is provided to the POD (S1OO), the CPU 209 stores a last address of the transport stream (TP_in1) read from the HDD 208 and a last address of the re-stored transport stream (S110). After another transport stream has been descrambled, the transport stream (TP_in1) is descrambled using the address informations.

When the descrambled transport stream (TP_in1) is stored in the HDD 208, a timestamp is appended to the transport stream (TP_in1). The timestamp indicates a time point of receiving the transport stream (TP_in1). The timestamp is appended to the transport stream (TP_in1) when the transport stream (TP_in1) is stored in the HDD 300. This is to prevent a decoding error of the decoder 206 due to an overflow or underflow of a buffer (not shown in the drawing) of the decoder 206.

Accordingly, the present invention enables to descramble both of the transport stream of the viewing (displaying) channel and the transport stream of the recording channel using the POD that descrambles the stream of one scrambled channel.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A personal video recorder system, comprising:

a first tuner configured to receive a first scrambled stream;

a second tuner configured to receive a second scrambled stream;

a demultiplexer connected to the first and second tuners and configured to receive and demultiplex the first and the second scrambled streams from the first tuner and the second tuner;

a storage connected to the demultiplexer;

a point of deployment (POD) module connected to the demultiplexer via a POD interface, the POD module configured to descramble a single scrambled stream at a time;

a control unit connected to the POD interface and the demultiplexer, the control unit configured to control the POD interface and the demultiplexer so that the second scrambled stream is preferentially descrambled upon receipt, the first scrambled stream is stored in the storage while the second scramble stream is descrambled, and the stored first scrambled stream is automatically retrieved and descrambled only when the demultiplexer does not receive a stream from one of the first and second tuners and when the demultiplexer does not receive another stream from the storage; and a decoder connected to the POD interface and configured to decode the descrambled streams output from the POD.

2. The personal video recorder system of claim 1, wherein the demultiplexer is configured to append a time stamp to the first scrambled stream stored in the storage.

3. The personal video recorder system of claim 1, wherein the POD module is configured to detect a descrambling information from the stored streams.

4. The personal video recorder system of claim 3, wherein the POD module is configured to produce a descrambling key based on the detected descrambling information and a separate descrambling information received from a broadcasting station.

5. The personal video recorder system of claim 1, wherein the control unit is configured to set up a storage location of the first scrambled stream in the storage and to control the POD to interrupt and then resume descrambling the stored first stream.

6. A method for controlling a personal video recorder, wherein the personal video recorder comprises a POD (point of deployment) module having a controllable interface and configured to descramble only one scrambled video stream at a time, a demultiplexer, a storage and a decoder, the method comprising:

receiving multiplexed signal including a first scrambled stream and a second scrambled stream;

controllably demultiplexing the multiplexed signal and descrambling the demultiplexed first and second scrambled streams, including preferentially descrambling the second scrambled stream upon receipt, storing the first scrambled stream in the storage while the second scrambled stream is descrambled, and automatically retrieving and descrambling the stored first scrambled stream only when the demultiplexer does not receive an input stream from an external source and when the demultiplexer does not receive another stream from the storage.

7. The method of claim 6, further comprising:

decoding the descrambled first stream in the decoder.

8. The method of claim 6, the step of retrieving and descrambling the stored first scrambled streams further comprising:

reading the stored first scrambled stream storing an address of the read stream.

9. The method of claim 6, the step of retrieving and descrambling the stored first scrambled stream comprising:

detecting a descrambling information from the first scrambled stream;

producing a descrambling key based on the detected descrambling information and a separate descrambling information received from a broadcasting station; and descrambling the first scrambled stream using the descrambling key.

10. The method of claim 6, the step of storing the first scrambled stream in the storage comprises appending a time stamp to the first scrambled stream.

11. The method of claim 6, the step of storing the first scrambled stream in the storage further comprises storing an address of the first scrambled stream, the method further comprising the step of interrupting and resuming descrambling the first scrambled stream.

* * * * *